US010968146B2

(12) United States Patent
De La Torre

(10) Patent No.: US 10,968,146 B2
(45) Date of Patent: Apr. 6, 2021

(54) LAWN SUBSTITUTE AND METHODS THEREFOR

(71) Applicant: DLT GROWERS, INC., Ontario, CA (US)

(72) Inventor: Jaime De La Torre, Ontario, CA (US)

(73) Assignee: DLT Growers, Inc., Ontario, CA (US)

( * ) Notice: Subject to any disclaimer, the term of this patent is extended or adjusted under 35 U.S.C. 154(b) by 234 days.

(21) Appl. No.: 16/149,503

(22) Filed: Oct. 2, 2018

(65) Prior Publication Data

US 2019/0100469 A1 Apr. 4, 2019

Related U.S. Application Data

(60) Provisional application No. 62/567,742, filed on Oct. 3, 2017.

(51) Int. Cl.

| | |
|---|---|
| *A01G 24/28* | (2018.01) |
| *C05F 11/08* | (2006.01) |
| *A01G 20/00* | (2018.01) |
| *C05G 3/80* | (2020.01) |

(52) U.S. Cl.
CPC .............. *C05F 11/08* (2013.01); *A01G 20/00* (2018.02); *A01G 24/28* (2018.02); *C05G 3/80* (2020.02)

(58) Field of Classification Search
CPC ........ A01G 24/00; A01G 24/28; A01G 24/22; A01G 24/23; A01G 24/20
See application file for complete search history.

(56) References Cited

U.S. PATENT DOCUMENTS

| | | | | |
|---|---|---|---|---|
| 2019/0023750 | A1* | 1/2019 | Thompson | C07K 14/27 |
| 2019/0337865 | A1* | 11/2019 | Wasko | C05D 9/00 |
| 2020/0002609 | A1* | 1/2020 | Mainwaring | A01N 25/30 |

* cited by examiner

*Primary Examiner* — Kristen C Hayes

(74) *Attorney, Agent, or Firm* — Martin Fessenmaier; Umberg Zipser LLP

(57) ABSTRACT

A mechanically resilient variety of *Rushia lineolata* is presented, particularly in combination with a conditioned growth medium. In preferred aspects, the variety is clonally selected for a small growth profile and mechanical resiliency to resist damage from foot traffic, and the growth medium includes a porous low-density glass component, an acidic organic absorbent component, and a microbial organic component to enhance the desired properties.

17 Claims, 2 Drawing Sheets

LAWN SUBSTITUTE AND METHODS THEREFOR

This application claims priority to our U.S. provisional application with Ser. No. 62/567,742, filed on Oct. 3, 2017, which is incorporated by reference herein in its entirety.

FIELD OF THE INVENTION

The field of the invention is new plant varieties, uses of new plant varieties, and methods of propagation and growing of new plant varieties, especially as it relates to varieties of *Rushia lineolata*.

BACKGROUND

The following description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

*Rushia lineolata*, a member of the Aizoaceae family is known as a decorative ground cover and is fairly common to semi-arid and arid climates encountered in Spain, South Africa, and Namibia. More recently, *Rushia lineolata* has been suggested for use as ground cover in Southern California, and exemplary varieties are known in the art, for example, at the URL huntington.org/BotanicalDiv/ISI/ISI2009/2009-26.html, or at the URL shop.cacti.com/landscape-succulents/ruschia-lineolata/. While attractive and suitable for drought tolerant landscaping, the plant is relatively tall and generally unsuitable for foot traffic due the fragile nature of the leaves. As such, *Rushia lineolata*, while a groundcover can generally not be used as a lawn substitute.

Thus, there is still a need for improved varieties and methods of growing *Rushia lineolata* to achieve a hardy ground cover that is sufficiently small and suitable for foot traffic and can be used as a lawn substitute, yet drought tolerant and attractive in growth and florescence.

SUMMARY OF THE INVENTION

The inventive subject matter is directed to a plant variety of *Rushia lineolata*, *Rushia lineolata* "Nana," and methods of cultivation that enable growth of the plant in a manner such as to produce a hardy ground cover that is sufficiently small and suitable for foot traffic, yet drought tolerant and attractive in growth and florescence.

In one especially preferred aspect, a method of growing *Rushia lineolata* is contemplated in which a selected variety of *Rushia lineolata* is cultivated under conditions that promote low profile growth and improved hardiness. Most preferably, the selected variety is clonally selected for lower profile growth and improved hardiness, which is further enhanced in a conditioned soil that comprises a porous low-density glass component, a Sphagnum (peat moss) component, and a decomposed wood shaving component to so produce a hardy and drought tolerant groundcover.

In another preferred aspect, the inventive subject matter is directed towards a plant growth medium, comprising: a mixture of perlite, peat moss, and a decomposed organic component, wherein perlite and peat moss are mixed in a ratio of 55-65 wt % perlite and 35-45 wt % peat moss, and wherein the mixture of perlite and peat moss is mixed with the decomposed organic component in the ratio of 60-70% by volume of perlite and peat moss, and 30-40% by volume of the decomposed organic component. Also contemplated herein is a kit comprising: a *Rushia lineolata* Nana plant and the plant growth medium as described above.

Various objects, features, aspects and advantages of the inventive subject matter will become more apparent from the following detailed description of preferred embodiments, along with the accompanying appendix.

DETAILED DESCRIPTION

Figure 1:
FIG. 1 illustrates an exemplary picture of the groundcover *Rushia lineolata* 'Nana' disclosed herein.

The inventors have discovered that a *Rushia lineolata* variety with desirable properties, and especially with low growth profile and high mechanical resiliency can be prepared using clonal selection in combination with specific growth media, and exemplary methods of propagation and growth media for this plant variety are disclosed. One preferred variety is the clonal variety *Rushia lineolata* 'Nana'. In one embodiment, the inventors performed multiple successive rounds of clonal selection from cuttings for isolation of desirable properties in the *Rushia lineolata* 'Nana' plant. Unexpectedly, when using specific conditioned growth media, the so selected plants could be propagated in a manner that further enhanced the desirable properties.

More specifically, the *Rushia lineolata* 'Nana' plant, which is also referred to as the "dwarf carpet of stars" as described herein, is an evergreen succulent with rubbery texture and blooms in spring and autumn. The plant has small flowers with pink stripes on white pedals. The *Rushia lineolata* 'Nana' plant has several advantages desirable in groundcovers, such as low maintenance, drought tolerance and having a vibrant evergreen color. In one embodiment, this plant can tolerate full sun, with a cold tolerance as low as 20° F. and a heat tolerance as high as 120° F. This low maintenance grass substitute is resistant to frost and never needs to be mowed because, when grown in the conditioned growth medium disclosed herein, it reaches a height up to 5 inches, or more preferably up to 4 inches, or more preferably up to 3 inches, or more preferably up to 2.5 inches, or more preferably up to 2 inches, or most preferably up to 1.5 inches. Moreover, when grown in such medium, the plant tolerates foot traffic well and provides erosion and weed control. In one embodiment, the plant may also be used in a living roof, or to make a vertical living wall, or a living vertical fence.

For example, in one aspect of the inventive subject matter, the inventor obtained a variety of *Rushia lineolata* by trimming from a larger growth in Barcelona, Spain. That original variety of *Rushia lineolata*, from which the inventors created the new variety, was of medium height (about 12-15 cm) and readily crushed under foot when walking on the variety. This original variety had several undesirable characteristics as a ground cover. First, with medium height, it was not effective as a ground cover because most people desire ground covers that stay close the ground. Second, because the plant readily crushes under foot, playing, walking, or running in a yard covered by the original *Ruschia lineolata* is not pleasant. Foot traffic in a yard planted with the original *Ruschia lineolata* results in the plant being injured or dead, which would require replanting of the plant. This results in extra time and effort on the part of the homeowner to plant new groundcovers.

The instant inventors overcame the above deficiencies of *Ruschia lineolata* by using multiple and successive rounds of propagation and trimming and re-propagation of the smallest trimmings, which led to a substantially smaller clonal population when propagated on a specific conditioned growth medium. Indeed, the inventors surprisingly found that when the re-propagated trimmings were planted in the specific growth medium disclosed herein, the plants were much smaller and readily took foot traffic without crushing the leaves or the plant itself. Remarkably, the inventors also noted that without the conditioned growth medium the clonally selected plants would fail to thrive or even grow.

The *Ruschia lineolata* Nana variety as disclosed herein forms a dense mat of evergreen succulent plant. When mature, the groundcover plant grows up to 2 inches tall from the ground, having succulent leaves that are up to 0.5 inch long. Each plant can spread to several feet wide wherein the main runners or stems give rise to secondary runners or stems and spread out over an area to cover the ground. In one embodiment the horizontal runners can grow up to 50 inches in length, or more preferably up to 40 inches in length, or more preferably up to 30 inches in length, or more preferably up to 20 inches in length, or more preferably up to 10 inches in length, or more preferably up to 5 inches in length, or more preferably up to 3 inches in length. In some embodiments, the horizontal runners average 5-6 inches in length once mature. Flowers may appear in the plant throughout the year, but more vigorously in the spring and fall seasons. Many different colors for the flowers are contemplated, for example, white, pink, red, yellow etc. The plant performs well in full sun or partial shade. Besides being a ground cover, *Ruschia lineolata* also works well to prevent weeds from growing. Furthermore, it can be planted on hilly slopes to control erosion. In areas where wild fire is common, *Ruschia lineolata* groundcover acts as a fire retardant as well.

The conditioned medium for growing *Rushia lineolata* 'Nana' comprises a porous low density glass component, an organic adsorbent component, and a microbial organic component. In preferred embodiment, the conditioned medium is free of contaminants such as seeds, pests, and diseases. Preferably, but not necessarily, the conditioned medium may further comprise a nitrogen rich fertilizer.

The porous low-density glass component may comprise a mineral or a volcanic glass. The mineral may be vermiculite, or other similar minerals that has the capacity to absorb or retain (typically via capillary action) water. The volcanic glass may be pumice, perlite, obsidian, apache tears, tachylite, Sideromelane, Palagonite, Hyaloclastite, Pele's hair, Pele's tears, and/or Limu o Pele. In preferred embodiments the volcanic glass is perlite, obsidian, or synthetic versions thereof, such as hollow glass microspheres, or hollow siliceous materials. Growstones, an aggregate produced from finely ground waste glass, may also be used as the porous low-density glass component. In one preferred embodiment, the porous low-density glass component comprises perlite. Perlite is a porous substance that offers both excellent water retention and drainage capabilities. Perlite resists soil compaction and encourages aeration which is necessary for healthy root growth in plants. Perlite is organic and helps lower the environmental impact in sustainable gardening. Therefore, suitable low density glass components will provide mechanical stability, will not change pH of the surrounding soil, will adsorb or otherwise retain water, and may have a high surface area (e.g., hollow microspheres, reticulated or vermiculite structure, etc.)

The organic adsorbent component, as disclosed herein, preferably comprises a natural organic product that has a high pore volume, holds moisture and air, and has a stable structure. The organic adsorbent component may have an acidic pH or a neutral pH. In one preferred embodiment, the acidic organic adsorbent component is peat moss, or other man-made materials having similar characteristics as peat moss. Other examples of the organic adsorbent component include, wood fiber, sawdust, cellulose fibers obtained from paper and/or cellulose, sphagnum moss, and coconut coir. Peat moss offers many important benefits to plants. First, it is a highly absorbent material and retains water better than other types of soil. Second, peat moss provides a sterile medium, and does not contain harmful chemicals, and/or weed seeds. Additionally, peat moss is relatively acidic, which makes it a great addition for acid-loving plants. Finally, peat moss can prevent soil compaction. Soil compaction reduces water absorption and does not provide a good medium for plants to grow. Peat moss helps the soil in getting rehydrated and preventing soil compaction. Notably, peat moss is used in agriculture in relatively moderate quantities (typically less than 5 wt %) due to its high degree of acidity. Advantageously, where peat moss (and other acidic media) was employed at relatively large quantities in a soil mixture (e.g., equal or greater than 10 wt %, equal or greater than 10 wt %, equal or greater than 15 wt %, equal or greater than 20 wt %, equal or greater than 25 wt %, equal or greater than 30 wt %, or even higher), *Rushia lineolata* exhibited a reduced vertical growth, particularly in the presence of a microbial organic component and the porous low-density glass component. Thus, and among other suitable options, preferred organic adsorbent components will be acidic (i.e., render pH of the soil equal or less than pH 6.5, equal or less than pH 6.0, equal or less than pH 5.5, equal or less than pH 5.0, equal or less than pH 4.5, equal or less than pH 4.0) and provide at least some water absorption (via swelling/air pockets).

The microbial organic component, as disclosed herein, preferably comprises organic matter that has been decomposed in the composting process and with may contain useful soil microbes that are beneficial for plants. For example, the microbial organic component may be compost or humus. The compost may be made of yard trimmings, food scraps, wood shavings, wood mulch, animal manure and bedding, or combinations thereof. The humus used herein comprises finely divided organic matter in soil, derived from microbial decomposition of plant and animal substances. In one preferred embodiment, the microbial organic component is decomposed wood shavings or decomposed wood mulch. By providing food for fungi and/or soil bacteria, wood mulch builds garden soil by increasing levels of organic matter in the soil bed. Moreover, the organic component also enhances water infiltration and retention, suppresses weeds, and moderates temperature of the soil. Therefore, numerous organic substrates are deemed suitable for use herein and particularly include those that have been at least partially subjected to microbial degradation (e.g., via wood decomposing yeast, fungi, and bacteria), and particularly wood degradation in acidic environments. Among other benefits, such materials will provide nutrients that are of organic origin (instead of mineral fertilizers). Notably, contemplated decomposition materials are generally not found in the same ecosystem as *Rushia lineolata* (e.g., decomposed wood shavings more common to forest environments in moderate climates while *Rushia lineolata* is more common to arid and hot climates (*Rushia lineolata* is a succulent). In one embodiment, the wood shavings may be nitrolized wood shavings. Nitrolized wood shavings are the result of a composting process that breaks down wood chips using Class A nitro-humus. Nitrolized wood shavings add nutrients and trace elements to the soil and improve water retention. The nitrolized wood chips also help to improve soil aeration and reduce compaction.

In some embodiments, the conditioned medium disclosed herein may further comprise a nitrogen rich fertilizer. Nitrogen is vital for lawn and/or lawn alternatives such as *Rushia lineolata* 'Nana' for growth and to give the vibrant green color. At the same time, other nutrients such as phosphorus and potassium are also necessary for the *Rushia lineolata* 'Nana' plant. Thus, in one embodiment, the conditioned medium disclosed herein is contemplated to comprise a fertilizer. The fertilizer may be an all-purpose fertilizer comprising nitrogen, phosphorus, and potassium, or it may be a nitrogen rich fertilizer. The fertilizer may be a slow release fertilizer. For example, in one embodiment, the fertilizer may be a slow release form of trinitromethane, commonly known as nitroform. The nitroform slow release formula would deliver a steady, balanced, and dependable source of nitrogen to the *Rushia lineolata* 'Nana' plant for up to 3 months, or 4 months, or 5 months, or 6 months, or more. The nitrogen source fertilizer may also be an organic fertilizer. For example, bat guano (bat dropping) is known to be one of the best sources of nitrogen for plants. Other nitrogen rich organic fertilizers that may be used in the growth medium comprise chicken manure, blood meal, alfalfa pellets, horse manure, compost tea, cottonseed meal, human or animal urine, seaweed, and kelp.

The inventors have found that the conditioned medium as disclosed herein works optimal for giving the plant *Rushia lineolata* 'Nana,' its low growth profile and mechanical resilience. This may be because the combination of the porous low-density glass component, the organic adsorbent component, and the microbial organic component in the ratio disclosed herein gives the *Rushia lineolata* 'Nana' plant the perfect soil conditions necessary for its growth, with the porous low density glass component storing water and providing a continuous slow release moisture to the plant, the organic adsorbent component preventing soil compaction and holding soil nutrients, and the microbial organic component releasing nutrients necessary for the healthy growth of the plant. This results in a planting medium where the water permeability and breathability of the planting soil are improved.

In one preferred embodiment, the inventors noted that for optimum growth of *Rushia lineolata* 'Nana,' having the desired properties such as mechanical resilience and low growth profile, the conditioned growth medium included perlite as a porous low-density glass component, peat moss as an organic absorbent (and acidic) component, and decomposed wood shaving as microbial organic component.

Figure 2:
FIG. 2 illustrates the high mechanical resilience of the groundcover *Rushia lineolata* 'Nana' disclosed herein, illustrating that it tolerates foot traffic.

In a preferred embodiment, the conditioned growth medium, comprises a mixture of perlite, peat moss, and a decomposed organic component, wherein perlite and peat moss are mixed in a ratio of 55-65 wt % perlite and 35-45 wt % peat moss, and wherein the mixture of perlite and peat moss is mixed with the decomposed organic component in the ratio of 60-70% by volume of perlite and peat moss, and 30-40% by volume of the decomposed organic component. In an especially preferred embodiment, the conditioned growth medium included a mixture of perlite (60 wt %) and peat moss (40 wt %), wherein the mixture was further combined with decomposed wood shavings at a ratio of 2/3 of the mixture to 1/3 of the decomposed wood shavings. FIG. 1 shows an exemplary picture of the groundcover *Rushia lineolata* 'Nana' being cultivated in a conditioned medium comprising a mixture of perlite (60 wt %) and peat moss (40 wt %), and 2/3$^{rd}$ of this mixture with 1/3 mixture of decomposed wood shavings. As shown in FIG. 1, this leads to a beautiful vibrant green groundcover which has mechanical resilience and low growth profile. The mechanical resilience is further illustrated in FIG. 2, which shows that the plant can tolerate foot traffic easily.

Other growth mediums have been tried by the inventors as well, and it was found that a growth medium having only peat moss resulted in the *Rushia lineolata* 'Nana' plant being yellow and drying out and resulting in many dead plants. However, when peat moss was blended with perlite and nitrolized wood shavings made of 30% red wood, 70% fur shavings and nitroform slow release fertilizer 39-0-0, the inventors were able to grow a low growing green plant as described. In one embodiment, when *Rushia lineolata* 'Nana' was planted directly on local soil (clay/sandy loam), instead of planting it in the growth medium, it resulted in a *Rushia lineolata* 'Nana,' having a higher growth profile and/or not having the desired mechanical resilience.

While not wishing to be bound by any particular theory or hypothesis, the inventor now contemplates that the desired properties such as mechanical resilience and low growth profile are obtained by a combination of soil acidity, particular microbial flora in the conditioned growth medium, and drainability of the conditioned growth medium. Indeed, upon use of the so prepared conditioned growth medium, *Rushia lineolata* was grown at an average eight of no more than 5 cm. Even more noteworthy, the *Rushia lineolata* had a mechanical resilience that tolerated foot traffic by adults in a repeated manner without damaging the growth.

The inventive concept is further contemplated to include a kit comprising a *Rushia lineolata* Nana plant and the plant growth medium disclosed herein. The kit is useful for practicing the inventive method of producing a lawn substitute comprising the *Rushia lineolata* plant. The kit is an assemblage of materials or components, including at least one of the inventive compositions. Thus, in some embodiments the kit contains a growth medium having perlite, peat moss, and decomposed organic materials, as described above.

The exact nature of the components configured in the inventive kit depends on its intended purpose. For example, the kit may be configured for the purpose of planting lawn seedlings. Or the kit may be configured for the purpose of providing groundcover between accent plants in a garden area. Instructions for use may be included in the kit. "Instructions for use" typically include a tangible expression describing the technique to be employed in using the components of the kit to effect a desired outcome, such as having a beautiful green lawn without brown or grey spaces. Such instructions may be provided to a gardener for convenience and citing suitable ways to preserve the utility of the *Rushia lineolata* plant.

The components of the kit are typically contained in suitable packaging material(s). As employed herein, the phrase "packaging material" refers to one or more physical structures used to house the contents of the kit, such as inventive compositions and the like. The packaging material is constructed by well-known methods, preferably to provide a sterile, contaminant-free environment. The packaging materials employed in the kit are those customarily utilized in the gardening and landscaping industry. As used herein, the term "package" refers to a suitable solid matrix or material such as glass, plastic, paper, foil, and the like, capable of holding the individual kit components. The packaging material generally has an external label which indicates the contents and/or purpose of the kit and/or its components.

Of course, it should be appreciated that contemplated methods need not be limited to use of clonally selected varieties of *Rushia lineolata* Nana, but that native varieties are also deemed suitable. Likewise, it should be recognized that the conditioned growth medium may include various items other than perlite as the porous low-density glass component, and especially contemplated porous components include hydroponic materials, tufa, rice hulls, etc. Similarly, the organic absorbent (and acidic) component need not be limited to peat moss, and various substitutes may be employed such as coconut fiber/coir, dried biosolids, etc, while alternative microbial organic component may include various decomposed wood and plant parts, typically chipped or otherwise diminuend to increase surface area.

As will be readily appreciated, the plant varieties and methods presented herein will be particularly suitable for use as lawn substitute, even for areas that are subject to high pedestrian traffic. Notably, the lawn substitute is low enough to give the appearance of grass with a vibrant green color. Additionally, it should be recognized that the combination of the conditioned growth medium and the plant varieties presented herein are drought tolerant and as such especially suitable for semi-arid and arid climates in the US such as, for example, found in large parts of California, Arizona, Nevada, New Mexico, and Texas.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of propagating or cultivating a variety of *Rushia lineolata*, comprising:
   providing a variety of *Rushia lineolata*; and
   propagating or cultivating the variety in a conditioned medium that includes a porous low-density glass component, an acidic organic absorbent component, and a microbial organic component; and
   wherein conditioned medium is prepared by mixing the porous low-density glass component and the acidic organic adsorbent component in a ratio of 55-65 wt % perlite and 35-45 wt % peat moss, and wherein 60-70% by volume of the above mixture is mixed with 30-40% by volume of the decomposed organic component to obtain the conditioned medium.

2. The method of claim 1 wherein the variety of *Rushia lineolata* is a clonally selected variety.

3. The method of claim 1, wherein the porous low-density glass component comprises perlite.

4. The method of claim 1, wherein the acidic organic absorbent component comprises peat moss.

5. The method of claim 1, wherein the microbial organic component comprises decomposed wood shavings.

6. The method of claim 1, wherein the *Rushia lineolata* plant grows up to 2 inches tall from the ground.

7. The method of claim 1, wherein the *Rushia lineolata* plant has succulent leaves that are up to 0.5 inches long.

8. The method of claim 1, wherein the *Rushia lineolata* plant is planted in the garden as a groundcover.

9. The method of any of claim 1, wherein the leaves of the *Rushia lineolata* plant have high mechanical resiliency and can take foot traffic.

10. A plant growth medium, comprising:
    a mixture of perlite, peat moss, and a decomposed organic component,
    wherein perlite and peat moss are mixed in a ratio of 55-65 wt % perlite and 35-45 wt % peat moss, and
    wherein the mixture of perlite and peat moss is mixed with the decomposed organic component in the ratio of 60-70% by volume of perlite and peat moss, and 30-40% by volume of the decomposed organic component.

11. The plant growth medium of claim 10, wherein the decomposed organic component comprises compost.

12. The plant growth medium of claim 10, wherein the decomposed organic component comprises decomposed wood shavings.

13. The plant growth medium of claim 10, wherein the growth medium is useful for growing succulents.

14. A kit comprising:
   a. a *Rushia lineolata* plant; and
   b. the plant growth medium comprising a mixture of perlite, peat moss, and a decomposed organic component,
      wherein perlite and peat moss are mixed in a ratio of 55-65 wt % perlite and 35-45 wt % peat moss, and
      wherein the mixture of perlite and peat moss is mixed with the decomposed organic component in the ratio of 60-70% by volume of perlite and peat moss, and 30-40% by volume of the decomposed organic component.

15. The kit of claim 14, wherein the decomposed organic component comprises compost.

16. The kit of claim 14, wherein the decomposed organic component comprises decomposed wood shavings.

17. The kit of claim 14, wherein the kit is for a lawn substitute.

* * * * *